United States Patent
Brooks et al.

(10) Patent No.: US 10,379,928 B2
(45) Date of Patent: Aug. 13, 2019

(54) PREVENTING SOFTWARE COMPONENT TIMER PROCESSING ISSUES

(71) Applicant: INTERNATIONAL BUSINESS MACHINES CORPORATION, Armonk, NY (US)

(72) Inventors: Michael D. Brooks, Southampton (GB); Alan Hollingshead, Eastleigh (GB); Julian C. Horn, Eastleigh (GB); Mark Pocock, Eastleigh (GB); Philip I. Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 15/635,362

(22) Filed: Jun. 28, 2017

(65) Prior Publication Data

US 2019/0004889 A1 Jan. 3, 2019

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ...... *G06F 11/0757* (2013.01); *G06F 11/0706* (2013.01); *G06F 11/079* (2013.01); *G06F 11/302* (2013.01); *G06F 11/3495* (2013.01)

(58) Field of Classification Search
CPC ............ G06F 11/0706; G06F 11/0757; G06F 11/079; G06F 11/302; G06F 11/3495
See application file for complete search history.

(56) References Cited

U.S. PATENT DOCUMENTS

| 8,051,418 | B1 | 11/2011 | Dice | |
|---|---|---|---|---|
| 9,081,629 | B2 | 7/2015 | Levine | |
| 9,354,926 | B2 | 5/2016 | King-Smith et al. | |
| 2004/0117796 | A1* | 6/2004 | Dichter | G06F 11/3423 718/107 |
| 2012/0066439 | A1* | 3/2012 | Fillingim | G06F 11/3485 711/103 |
| 2012/0159259 | A1* | 6/2012 | Klein | G06F 11/0757 714/38.1 |
| 2013/0227586 | A1 | 8/2013 | Levine et al. | |
| 2016/0357895 | A1* | 12/2016 | Hyde | G06N 7/005 |

OTHER PUBLICATIONS

May, "IBM i wait accounting," IBM developerWorks, Aug. 22, 2013, p. 1-12, IBM Corporation.
Mell et al., "The NIST Definition of Cloud Computing," National Institute of Standards and Technology, Sep. 2011, p. 1-3, Special Publication 800-145.

* cited by examiner

*Primary Examiner* — Joshua P Lottich
(74) *Attorney, Agent, or Firm* — Alexis N. Hatzis (57) ABSTRACT

Method and system are provided for preventing local processing problems interfering with a time-sensitive validation process. The method monitors an elapsed time of an instance of a time-sensitive validation process of a software component including dispatching of the process instance and determines if the elapsed time is significantly greater than a preset processing time. If so, the method may dynamically alter error processing of the time-sensitive validation process of the software component.

18 Claims, 6 Drawing Sheets

PREVENTING SOFTWARE COMPONENT TIMER PROCESSING ISSUES

BACKGROUND

The present invention relates generally to preventing software component timer processing issues, and more specifically, to preventing such issues due to local processing problems.

When software components are starved of processing by the operating system due to an overload in the system, this can lead to a wide variety of knock-on failures. For any software components with hard coded wait timers, the results can be highly unpredictable. This is due to the software components being unable to determine if the system they are waiting for has been the cause of the delay or if they themselves are the cause of the delay as they have not been dispatched by the operating system.

SUMMARY

According to a first aspect of the present invention there is provided a computer-implemented method for preventing local processing problems interfering with a time-sensitive validation process comprising: monitoring an elapsed time of an instance of a time-sensitive validation process of a software component including dispatching of the process instance and determining if the elapsed time is significantly greater than a preset processing time and, if so, dynamically altering error processing of the time-sensitive validation process of the software component.

According to another aspect of the present invention there is provided a system for preventing local processing problems interfering with a time-sensitive validation process comprising: a processor and a memory configured to provide computer program instructions to the processor to execute the function of the following component; an elapsed time monitoring component for monitoring an elapsed time of an instance of a time-sensitive validation process of a software component including dispatching of the process instance; a threshold component for determining if the elapsed time is significantly greater than a preset processing time; and an error processing component for dynamically altering error processing of the time-sensitive validation process of the software component.

According to a further aspect of the present invention there is provided a computer program product for preventing local processing problems interfering with a time-sensitive validation process, the computer program product comprising a computer readable storage medium having program instructions embodied therewith, the program instructions executable by a processor to cause the processor to: monitor an elapsed time of an instance of a time-sensitive validation process of a software component including dispatching of the process instance and determine if the elapsed time is significantly greater than a preset processing time and, if so, dynamically alter error processing of the time-sensitive validation process of the software component.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Software components may include time-sensitive validation processes. An example of such a process is a regular heartbeat sent by a software component at a local system to a remote system. The remote system receives the heartbeat message and must respond within a preset time otherwise error processing is activated.

Figure 1:
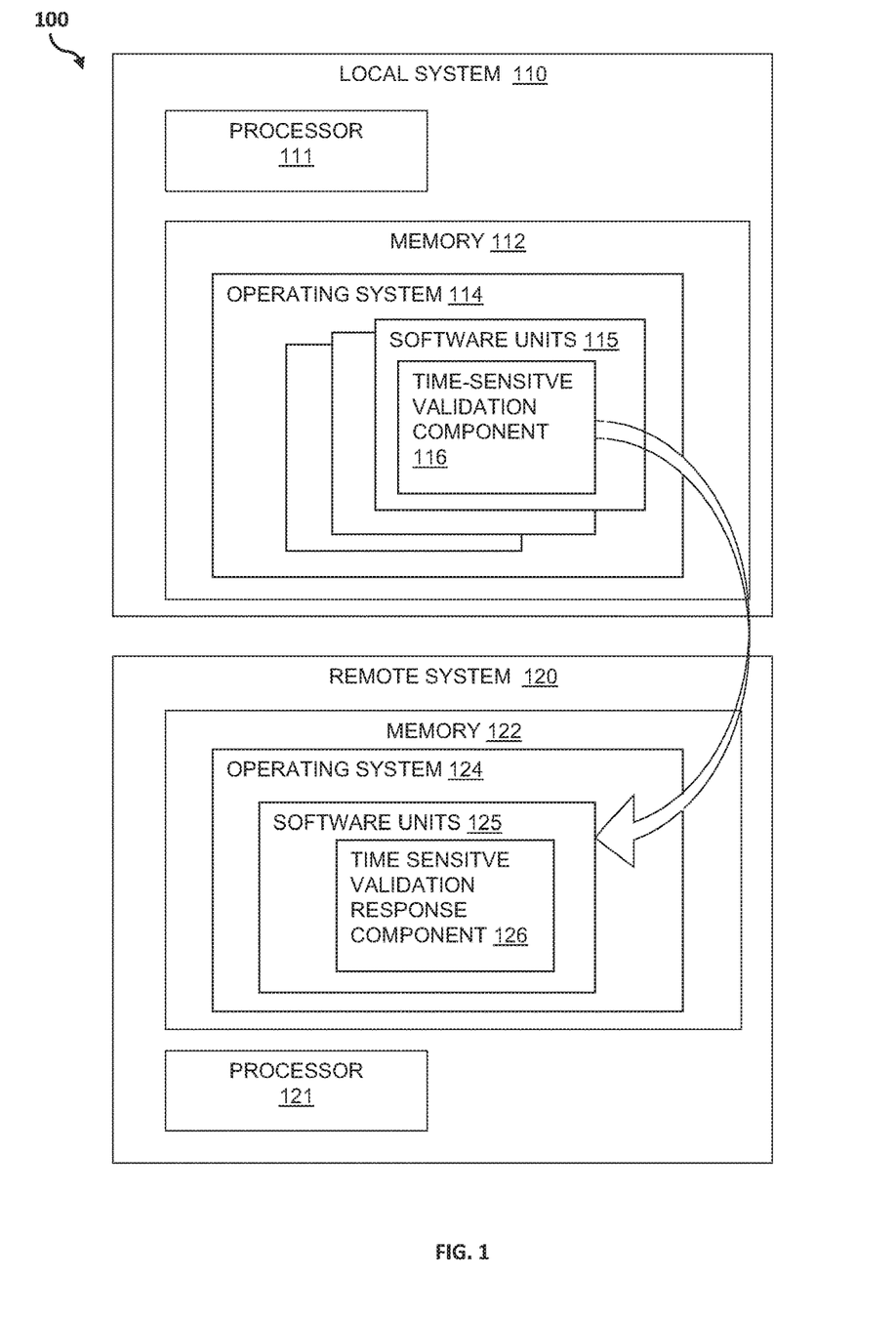
FIG. 1 is a block diagram of an example system with a time-sensitive validation process in accordance with the present invention.

Referring to FIG. 1, a block diagram 100 shows a local system 110 which may include at least one processor 111, a hardware module, or a circuit for executing software units 115 on the system 110. Multiple processors running parallel processing threads may be provided enabling parallel processing of some or all of the functions of the software units 115. Memory 112 may be configured to provide computer instructions to the at least one processor 111. The computer instructions may include an operating system 114 and software units 115 for carrying out required functions. Software units 115 may include a time-sensitive validation component 116 that may be hard coded into the source code.

A remote system 120 may include at least one processor 121, a hardware module, or a circuit for executing software units on the system 120. Multiple processors running parallel processing threads may be provided enabling parallel processing of some or all of the functions of the software units 115. Memory 122 may be configured to provide computer instructions to the at least one processor 121. The computer instructions may include an operating system 124 and a software unit 125 for providing a time-sensitive validation response component 126 for receiving and responding to wait timer calls from a time-sensitive validation component 116 of a software unit 115 of the local system 110.

A time-sensitive validation process may include wait timer logic of any known form, but an example is connection heartbeat processing which is used to validate a connection status between interconnected software components by the sending and receiving of small amounts of data.

An example of such a system is the Internet Protocol InterConnectivity (IPIC) heartbeat processing with IBM's Customer Information Control System (CICS) transaction servers (IBM and CICS are trademarks of International Business Machines Corporation).

CICS automatically sends IPIC heartbeat messages to systems that can respond to them. This ability to respond allows the integrity of the connection to be assessed and maintained by CICS regions through periods of inactivity.

IPIC connections use Transmission Control Protocol/Internet Protocol (TCP/IP) sockets that can be routed across wide area networks that route requests through firewalls that permit or deny network transmissions. These firewalls are typically configured with policies that block TCP/IP packets if no messages are transmitted over a particular socket in a specific period. If this happens, CICS transactions can hang if requests are sent across a dormant connection. CICS can maintain IPIC connections through periods of inactivity by maintaining a heartbeat that uses internal IPIC messages.

Once an IPIC connection is marked as failed, CICS will close all connections it is using, terminate the sockets, and uninstall any auto-installed connections. Recovery from this situation will require reinstallation of these connections and re-creation of the underlying sockets that may cause long delays in processing.

The time-sensitive logic is not part of this description and any time-sensitive logic may use the described method. An example of time-sensitive logic that is used in the description is connection heartbeat processing which is used to validate connection status between interconnected software components by the sending and receiving of small amounts of data.

A method and system are described for preventing local dispatching and executing problems interfering with timer processing of time-sensitive validation processes. The method monitors an elapsed time of a process of a software component including the dispatching of the process and determining if the elapsed time is significantly greater than a preset processing time of the time-sensitive validation process. If the elapsed time is significantly greater this indicates a delay in dispatch or execution of the processing.

Error processing of the time-sensitive validation process of the software component that is based on a wait timer relying on a request and response communication with an external system may be dynamically altered if such a dispatch delay is indicated.

An elapsed time from initiating a time-sensitive validation process to the time at which the time-sensitive validation process wakes up at the end of a preset processing time is recorded and compared to the preset processing time. The preset processing time may be a wait time for response from a remote system.

At any point during the flow of the time-sensitive validation process, the operating system may become overloaded and so may not be able to dispatch or execute the processes involved. This could occur at the start of the process, the end of the process, or at other points.

If the elapsed time is significantly larger than the preset processing time, then the time-sensitive validation process can infer that it has not been sufficiently dispatched or executed by the local operating system and it can dynamically alter its error processing to take account of this. This may be by increasing the preset processing time or resending the validation process. This allows the system to account for any local dispatching or executing problems which may have caused the system to stall during the preset processing time.

To determine the correct cause of action after a problematic local dispatching or execution situation is detected, the system may use a set of multiple retries of the validation process to work out if this is a temporary condition or a permanent condition. Retrying the validation process may stay in the validation process loop until the elapsed time is close to the preset processing time. A loop count may be used to ensure that the system does not loop indefinitely.

Figure 2:
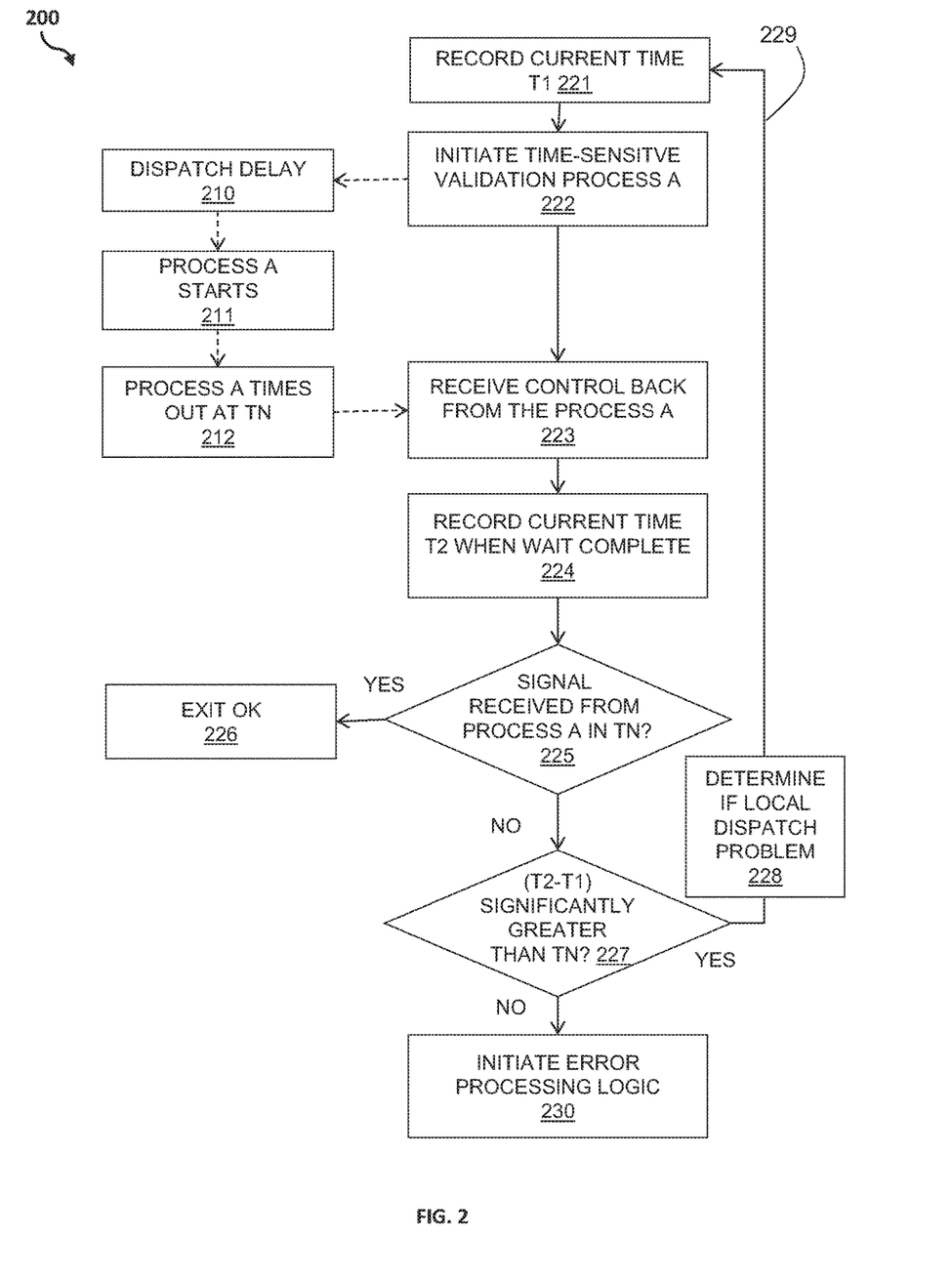
FIG. 2 is a flow diagram of an example embodiment of a method in accordance with the present invention.

Referring to FIG. 2, a flow diagram 200 shows an example embodiment of the described method implemented for monitoring a time-sensitive validation process with a preset processing time of Tn used to perform connection error recovery processing.

The monitoring method records a current time T1 221 just before a time-sensitive validation process A is initiated 222. The current time may be recorded in absolute time, for example "wall clock" time from the hardware, so that it is not subject to the use of the operating system to start a timer as the operating system may be overloaded. Current time T1 is taken before process A is initiated to take account of any dispatching problems before initiation of process A.

The time-sensitive validation process A is shown in parallel with the flow diagram 200 of the monitoring method and may have a dispatch delay 210 before it starts 211 and may time out at Tn 212. Process A is local to the current monitoring method and operating system and may itself initiate external communication with other processes; for example, as in the case of a network heartbeat.

The process A may wake up at the expiry of the preset processing time Tn 212 and may pass control back to the monitoring method that receives 223 the control back and records 224 the current time T2 when the preset processing time Tn is complete. Again, this may be recorded in absolute time. The current time T2, checked after Tn, is available from the operating system and can be relied upon as this is a function of the hardware.

It may be determined 225 if a signal has been received by the monitoring method that process A has executed correctly within time Tn. If a signal has been received from process A then the processing exits normally 226. This means that process A was completed within the present processing time Tn. The method may repeat to monitor another instance of the process A.

If there is no signal received from process A, then the monitoring method may analyze the elapsed time T2−T1 and, if this is significantly greater 227 than the preset processing time Tn, this indicates that there may be an unreliable local environment that has interfered with the time-sensitive validation processing.

At any point during the flow of the time-sensitive validation process A, the operating system may become overloaded and so may not be able to execute or dispatch the processes involved. This could occur at the start of process A, the end of process A, or at other points. If this has occurred, then the current time T2 will be much larger than expected.

An adjustment factor F may be used to determine if the difference between the elapsed time and the preset processing time Tn is significant. The adjustment factor F may apply a multiple to the present processing time Tn, such that T2−T1>Tn*F is determined or may apply an added time, such that T2−T1>Tn+F is determined.

The adjustment factor may be configured for a particular time-sensitive process such that the elapsed time is sufficiently large for a given situation that it would not normally occur during the validation processing.

If the time difference T2–T1 is significantly greater 227 than the preset processing time Tn, the monitoring method may take action to determine 228 if this is a local dispatching problem and may dynamically stop the normal error processing logic for the time-sensitive validation process A from being initiated.

If the time difference T2–T1 is not significantly greater 227 than the preset processing time Tn, then normal error processing logic for the time-sensitive validation process A may be initiated 230.

Alternatively or additionally, if the time difference T2–T1 is significantly greater 227 than the preset processing time Tn, the monitoring method may loop 229 to repeat the monitoring of another instance of process A. Multiple retries of the validation process A may be used to work out if this is a temporary condition or a permanent condition. Repeating the validation process A may continue until the elapsed time is close to the preset processing time Tn. A loop count may be used to ensure that the system does not loop indefinitely.

As an example, a heartbeat may be sent to a partner using a preset timer of 10 seconds to indicate how long the partner system has to receive and return a response to the heartbeat flow. However, if the operating system is overloaded, it may not be able to dispatch work for a period of time longer than this (for instance, it could be dumping causing stalls for at least 40 seconds). When the sending task is finally dispatched it may be that the system has not been able to action either the sending or receiving of the heartbeat or its response within the preset time. If the sending system is able to infer this when it wakes up from its 10 second timer, it would be able to take account of this and take appropriate action and so reduce the risk of false detections of failure.

The described method detects the cause of suspended threads timing out because the processors they are running on are overloaded and avoids error processing due to time-out events. The method measures the time a thread is idle to avoid unnecessary error processing.

The waiting task may ask the operating system dispatching component for CPU usage or dispatching statistics when it awakes from its set timer wait. The drawback of this solution is that it is more complex to design and code and requires another component in the system to collect the required data.

Figure 3:
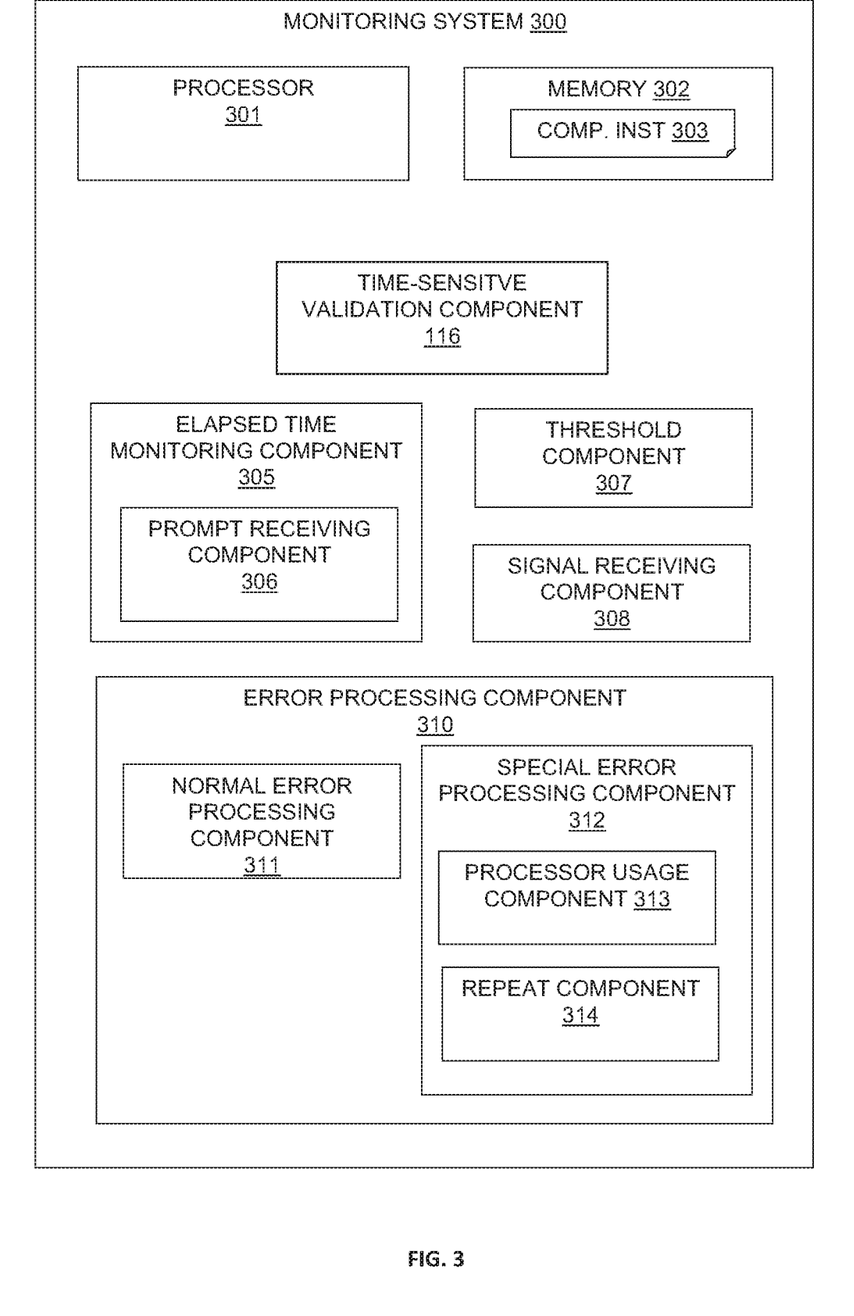
FIG. 3 is a block diagram of an example embodiment of a system in accordance with the present invention.

Referring to FIG. 3, a block diagram shows an example embodiment of a monitoring system 300 for preventing local dispatching problems interfering with a time-sensitive validation process. The monitoring system 300 may be provided in association with a time-sensitive validation component 116.

The monitoring system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The monitoring system 300 may include an elapsed time monitoring component 305 for monitoring an elapsed time of an instance of a time-sensitive validation process of the time-sensitive validation component 116. The elapsed time monitoring component 305 records a start time prior to initiating the instance of the time-sensitive validation process and records an end time when prompted by the end of the preset processing time of the time-sensitive validation process. In this way, the elapsed time includes the dispatching of the process instance. The elapsed time monitoring component 305 may use an absolute time such as that of the hardware to prevent any overload of the processor 301 affecting the monitored elapsed time. The elapsed time monitoring component 305 may include a prompt receiving component 306 for receiving prompts from the time-sensitive validation component 116 when it passes back control to the monitoring system 300.

The monitoring system 300 includes a threshold component 307 for determining if the elapsed time is significantly greater than a preset processing time of the time-sensitive validation component 116. The threshold component 307 applies an adjustment factor to the elapsed time that is configured for a particular time-sensitive validation component 116.

The monitoring system 300 may include a signal receiving component 308 for determining if a signal has been received in the preset processing time indicating that the time-sensitive validation component 116 has executed correctly.

The monitoring system 300 may include an error processing component 310 for dynamically altering an error processing component 310 of the time-sensitive validation component 116.

If the threshold component 307 determines that the elapsed time is not significantly greater than the preset processing time and the signal receiving component 308 determines that a signal has not been received in the preset processing time indicating that the time-sensitive validation component 116 has executed correctly, the error processing component 310 initiates a normal error processing component 311 for normal error processing logic for the time-sensitive validation component 116.

However, if the threshold component 307 determines that the elapsed time is significantly greater than the preset processing time and the signal receiving component 308 determines that a signal has not been received in the preset processing time indicating that the time-sensitive validation process has executed correctly, the error processing component 310 initiates a special error processing component 312.

The special error processing component 312 may include a processor usage component 313 for determining from an operating system dispatching component processor usage or dispatching statistics to determine if there is a local dispatch problem. The special error processing component 312 may include a repeat component 314 for repeating the monitoring of another instance of the time-sensitive validation process to determine if this is a temporary condition or a permanent condition. The repeat component 314 may repeat instances of the time-sensitive validation process until the elapsed time is close to the preset processing time.

The special error processing component 312 may avoid unnecessary error processing of the time-sensitive validation process as the system has indicated that the delay is due to a local dispatching delay and not the validation process itself.

Figure 4:
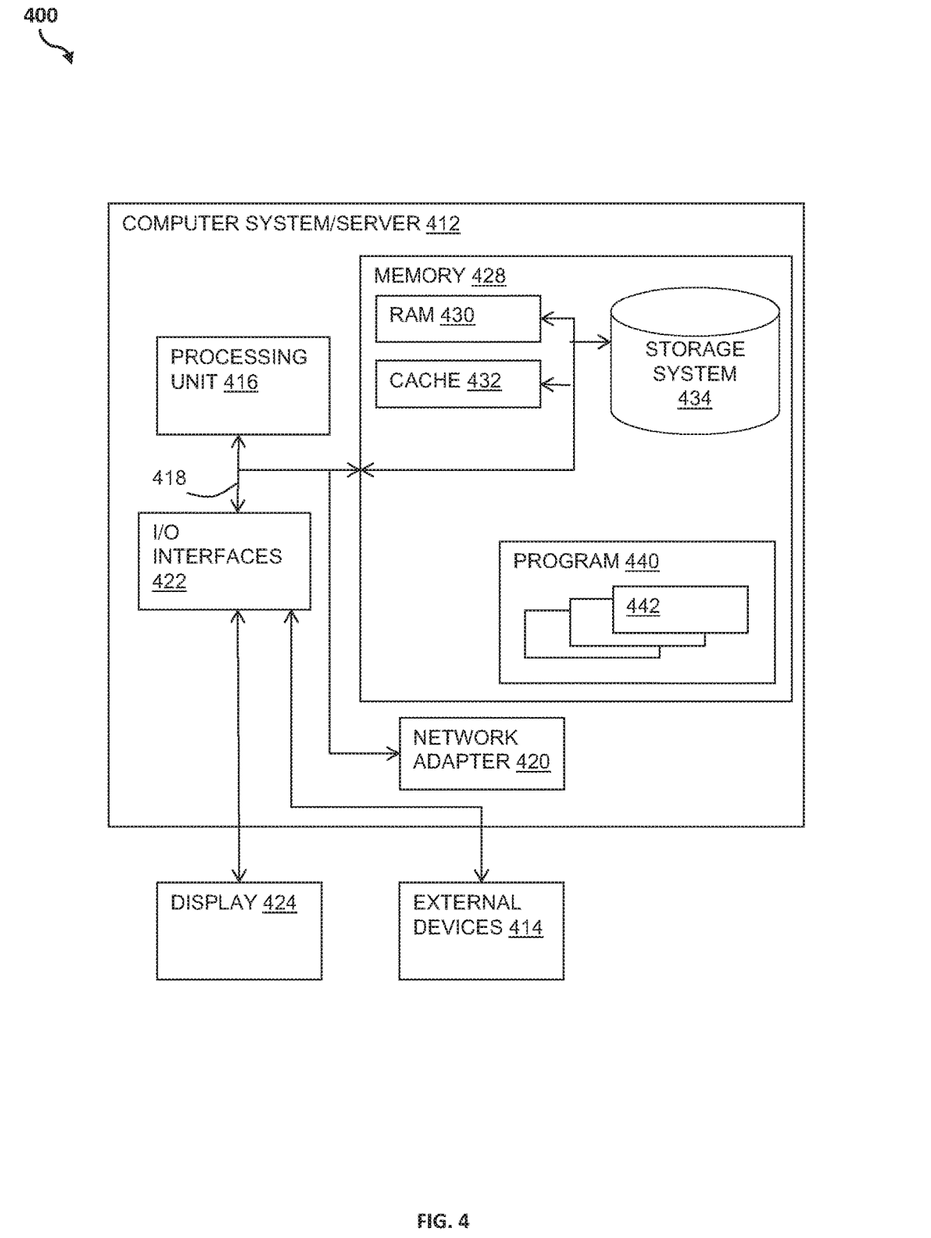
FIG. 4 is a block diagram of an embodiment of a computer system or cloud server in which the present invention may be implemented.

Referring now to FIG. 4, a schematic of an example of a system 400 in the form of a computer system or server is shown.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
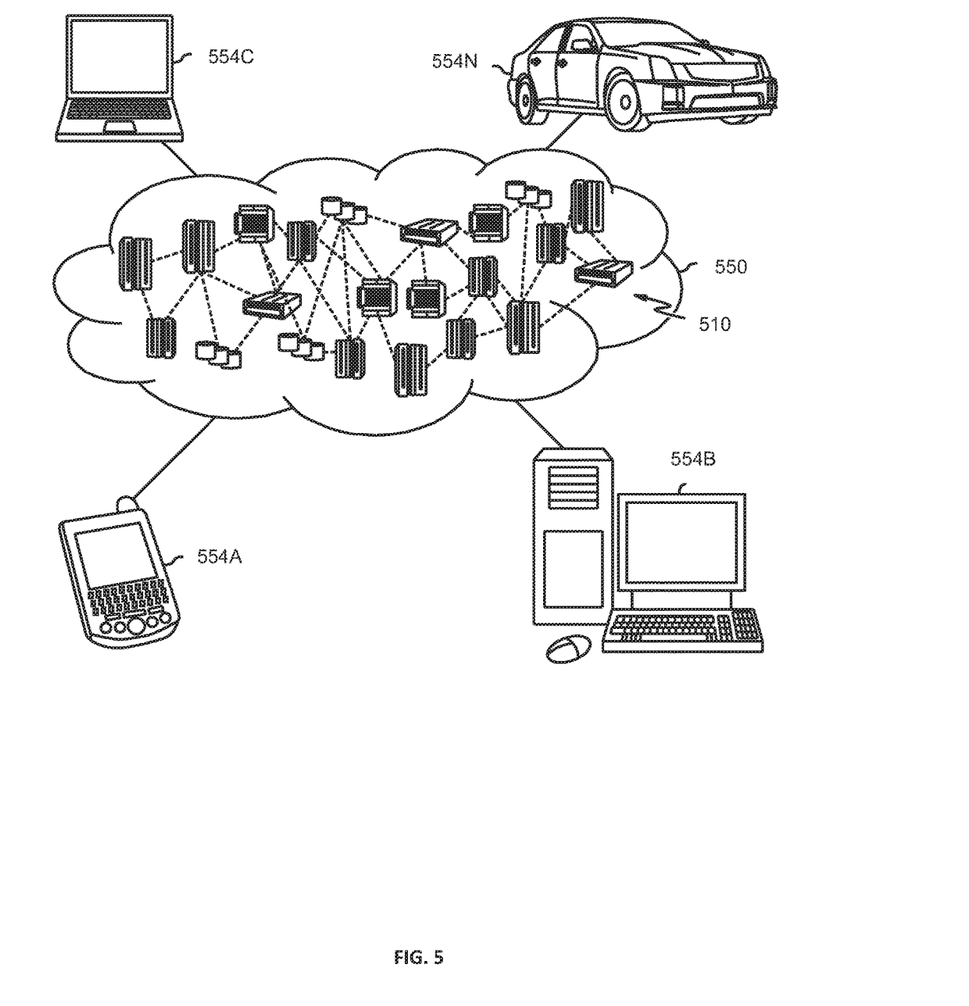
FIG. 5 is a schematic diagram of a cloud computing environment in which the present invention may be implemented.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
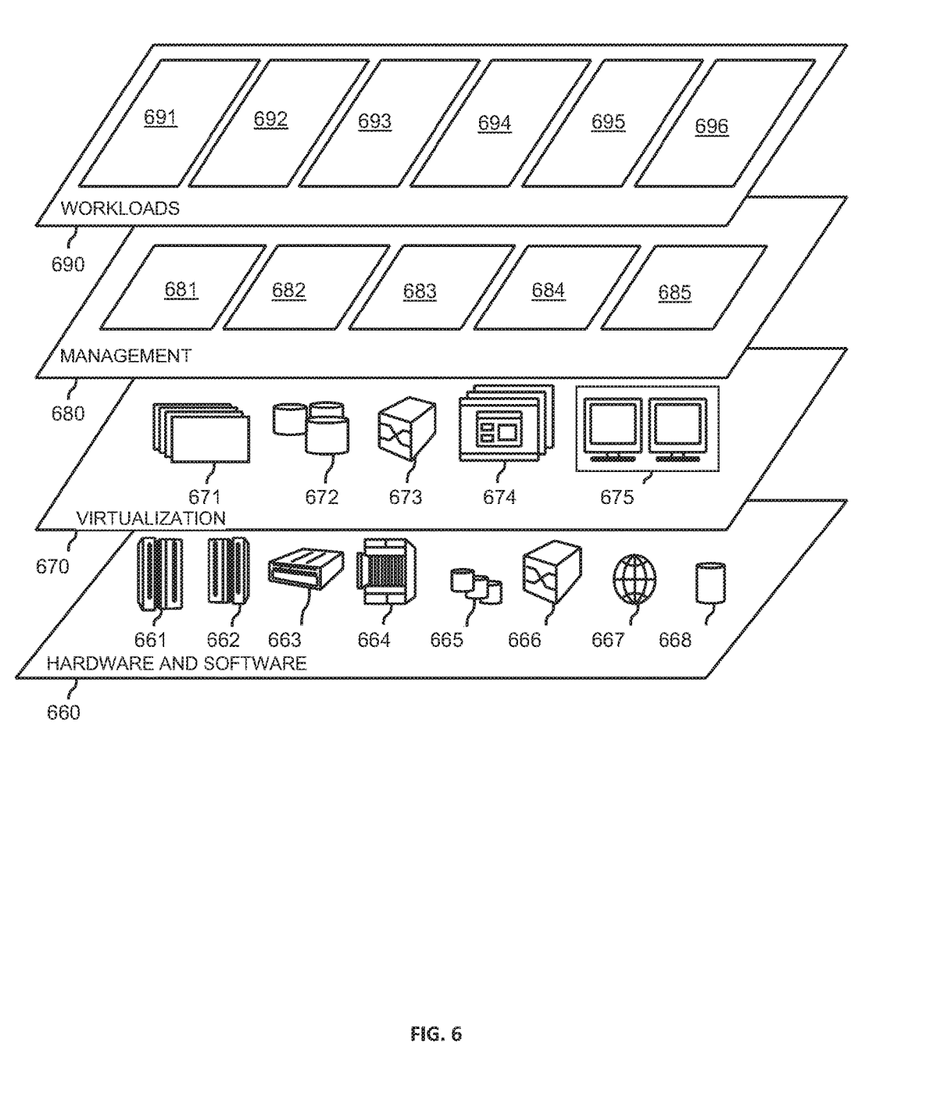
FIG. 6 is a diagram of abstraction model layers of a cloud computing environment in which the present invention may be implemented.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and time-sensitive validation processing and error processing 696.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for preventing local processing problems interfering with a time-sensitive validation process comprising:

monitoring an elapsed time of a process instance of a time-sensitive validation process of a software component including dispatching of the process instance and determining if the elapsed time is greater than a preset processing time, wherein the time-sensitive validation process includes a request and response communication with an external system; and dynamically altering error processing of the time-sensitive validation process of the software component.

2. The method of claim 1, further comprising:

determining that a signal has been received in the preset processing time indicating that the time-sensitive validation process has executed correctly; and exiting the time-sensitive validation process.

3. The method of claim 1, further comprising:

in response to determining that the elapsed time is not greater than the preset processing time and a signal has not been received in the preset processing time indicating that the time-sensitive validation process has executed correctly, initiating a normal error processing logic for the time-sensitive validation process.

4. The method of claim 1, wherein monitoring the elapsed time records a start time prior to initiating the instance of a time-sensitive validation process and records an end time when prompted by the end of the preset processing time of the time-sensitive validation process.

5. The method of claim 1, further comprising:

determining that the elapsed time is greater than a preset processing time; and applying an adjustment factor to the elapsed time, wherein the adjustment factor is configured for a particular time-sensitive validation process.

6. The method of claim 1, wherein dynamically altering error processing of the time-sensitive validation process of the software component includes determining from an operating system dispatching component processor usage or dispatching statistics to determine that there is a local dispatch problem.

7. The method of claim 1, wherein the method repeats the monitoring of another instance of the time-sensitive validation process to determine if this is a temporary condition or a permanent condition.

8. The method of claim 7, wherein repeating instances of the time-sensitive validation process continues until the elapsed time is close to the preset processing time.

9. The method of claim 1, wherein the time-sensitive validation process is a heartbeat process which is used to validate a connection status between interconnected software components by the sending and receiving of a portion of data.

10. A system for preventing local processing problems interfering with a time-sensitive validation process comprising:

a processor and a memory configured to provide computer program instructions to the processor to execute the function of the following component;

an elapsed time monitoring component for monitoring an elapsed time of an instance of a time-sensitive validation process of a software component including dispatching of the process instance, wherein the time-sensitive validation process includes a request and response communication with an external system;

a threshold component for determining that the elapsed time is greater than a preset processing time; and an error processing component for dynamically altering error processing of the time-sensitive validation process of the software component.

11. The system of claim 10, including a signal receiving component for determining that a signal has been received in the preset processing time indicating that the time-sensitive validation process has executed correctly, and exiting the time-sensitive validation process.

12. The system of claim 11, wherein the threshold component determines that the elapsed time is not greater than the preset processing time and the signal receiving component determines that a signal has not been received in the preset processing time indicating that the time-sensitive validation process has executed correctly, and the error processing component initiates normal error processing logic for the time-sensitive validation process.

13. The system of claim 10, wherein the elapsed time monitoring component monitoring the elapsed time records a start time prior to initiating the instance of a time-sensitive validation process and records an end time when prompted by the end of the preset processing time of the time-sensitive validation process.

14. The system of claim 10, wherein the threshold component applies an adjustment factor to the elapsed time, wherein the adjustment factor is configured for a particular time-sensitive validation process.

15. The system of claim 10, wherein the error processing component determines from an operating system dispatching component processor usage or dispatching statistics to determine that there is a local dispatch problem.

16. The system of claim 10, including a repeat component for repeating the monitoring of another instance of the time-sensitive validation process to determine that this is a temporary condition or a permanent condition.

17. The system of claim 16, wherein the repeat component repeats instances of the time-sensitive validation process until the elapsed time is close to the preset processing time.

18. A computer program product for preventing local processing problems interfering with a time-sensitive validation process, the computer program product comprising a non-transitory computer readable storage medium having program instructions embodied therewith, the program instructions executable by a processor to cause the processor to:

monitor an elapsed time of an instance of a time-sensitive validation process of a software component including dispatching of the process instance and determine if the elapsed time is greater than a preset processing time, wherein the time-sensitive validation process includes a request and response communication with an external system, and, if so, dynamically alter error processing of the time-sensitive validation process of the software component.

* * * * *